F. EBERHART.
PROCESS OF MAKING NON-CIRCULAR PAPER BOX BODIES.
APPLICATION FILED FEB. 11, 1910.
1,170,806.
Patented Feb. 8, 1916.
2 SHEETS—SHEET 1.
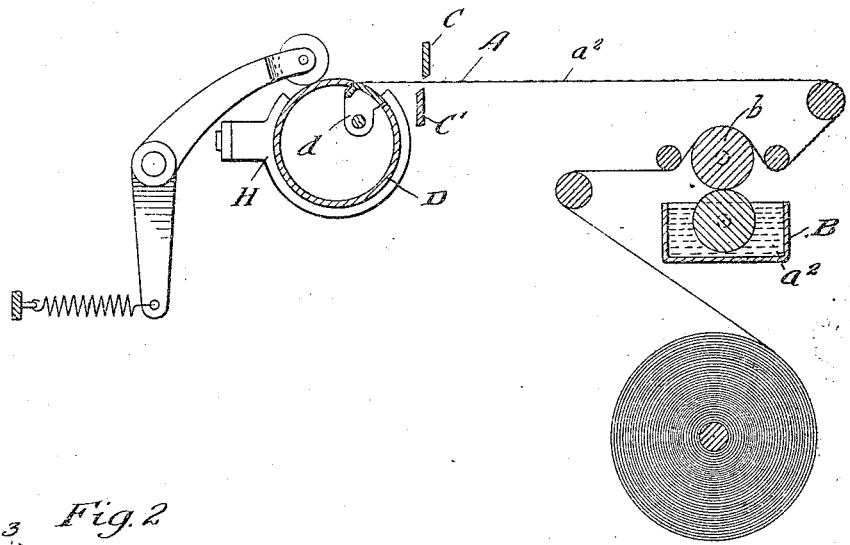
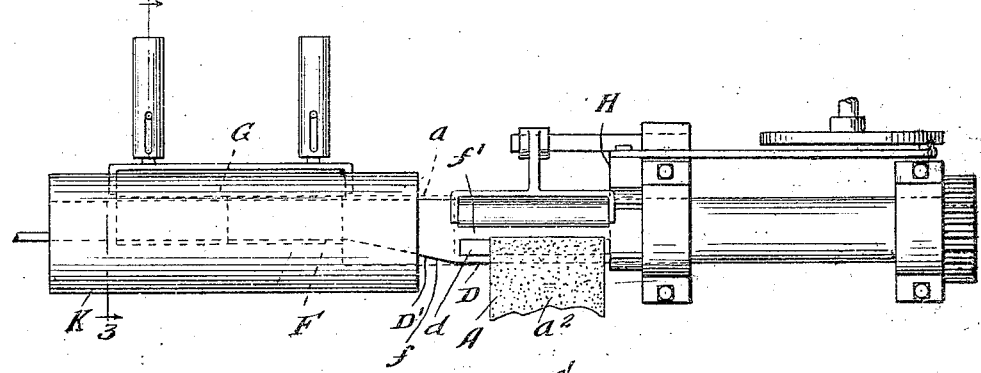
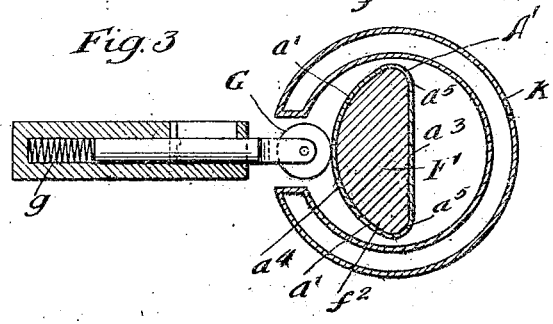
Witnesses:
Wm. Geiger
Pearl Abrams
Inventor:
Felix Eberhart
By Munday Evarts Adcock & Clarke
Attorneys

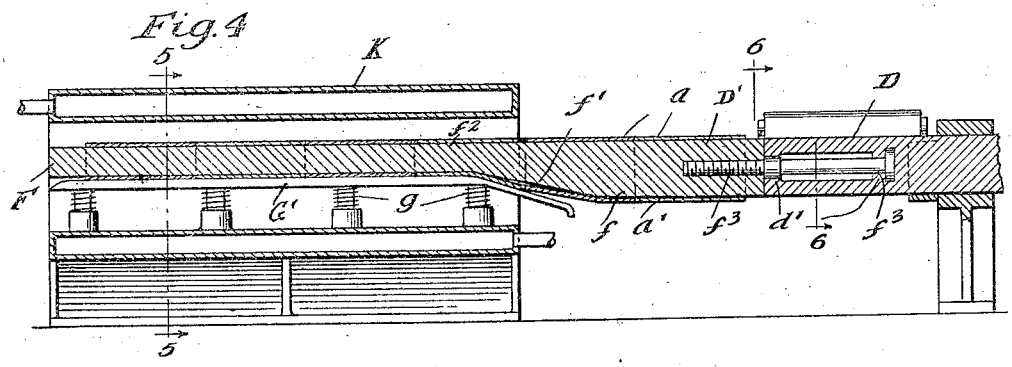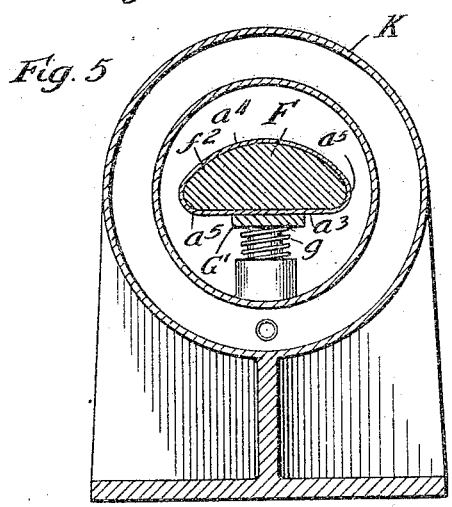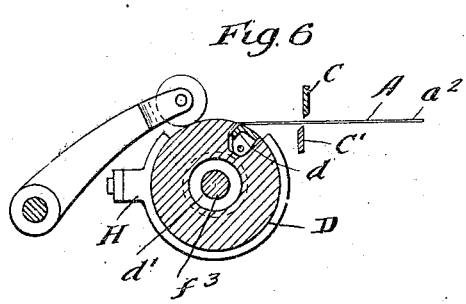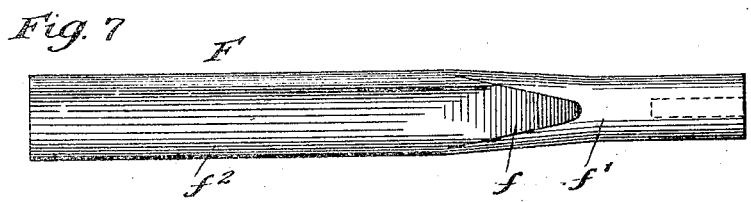

UNITED STATES PATENT OFFICE.

FELIX EBERHART, OF NEWARK, NEW JERSEY, ASSIGNOR TO AMERICAN CAN COMPANY, OF NEW YORK, N. Y., A CORPORATION OF NEW JERSEY.

PROCESS OF MAKING NON-CIRCULAR PAPER BOX-BODIES.

1,170,806.

Specification of Letters Patent.

Patented Feb. 8, 1916.

Application filed February 11, 1910. Serial No. 543,213.

*To all whom it may concern:*

Be it known that I, FELIX EBERHART, a citizen of the United States, residing in Newark, in the county of Essex and State of New Jersey, have invented a new and useful Improvement in Processes of Making Non-Circular Paper Box-Bodies, of which the following is a specification.

My invention relates to the art or process of manufacturing tubular paper bodies for boxes or other vessels, and more particularly to the manufacture of paper bodies of an irregular or non-circular cross section. Heretofore in the manufacture of such paper box or vessel bodies, the strip or web of paper is ordinarily wound upon a rotary mandrel of irregular or noncircular cross section, according to the particular shape of the body desired to be produced, suitable paste or glue being applied to one surface of the paper strip as it is wound to cause the several coils or laminæ to firmly adhere together, and the paste or glue dried after the bodies have been removed from the irregular or noncircular winding mandrel upon which they are formed. This method or process is objectionable and attended with difficulty in practical operation, owing to the constantly varying tension that the irregular shaped mandrel produces upon the moist or paste coated web of paper.

The object of my invention is to provide an improved method, or process for manufacturing laminated or other paper bodies of irregular or noncircular cross section, and by which the difficulties or objections heretofore experienced may be overcome.

My improved method or process of manufacturing laminated or other tubular paper bodies of irregular or noncircular shape consists in first winding, straight or spirally, the paper web or webs around a circular mandrel into a circular or cylindrical form, and then while the glue or paste uniting the several coils or laminæ of the paper body is yet moist or undried, shaping the circular or cylindrical body thus produced into the desired irregular or noncircular shape, and then baking or drying it while it is held or maintained in such irregular or noncircular shape, thus causing, by the drying or setting of the paste or glue, the body to permanently retain the desired shape in cross section.

In practising my invention, a tubular paper body is first formed by winding one or more paper strips or webs, straight or spirally, upon a circular or cylindrical mandrel, paste or glue being applied to one face or edge of the paper web or webs, as the same is or are wound upon the mandrel, and the paper strip or strips cut off after sufficient coils thereof have been wound upon the mandrel to produce a paper body of the desired thickness or number of coils; and then the paper body is passed onto a shaping mandrel, preferably merging or sloping into the winding mandrel or into a circular extension of the winding mandrel, while the paste or glue which unites the coils of the paper body is yet moist or undried or unset, the shaping mandred thus causing the freshly formed circular or cylindrical paper bodies to assume the required shape in cross section, while the glue or paste uniting the several coils or laminæ of the paper body is yet moist or undried, and then the shaped paper bodies are preferably baked or dried by application of heat thereto and preferably while maintained in the shaped form, thus causing by the drying of the paste or glue, the paper bodies to permanently retain the shape given them by the shaping mandrel.

To enable my improved method or process to be more readily understood by those skilled in the art, I have, in the accompanying drawing forming a part of this specification, illustrated in a diagrammatic manner, suitable appliances which may be used in practising my invention.

In said drawing, Figure 1 is a diagrammatic view, partly in elevation, and partly in section, showing a paste applying device and a circular winding mandrel for winding the paper web into a circular or cylindrical body and knives or cutters for severing the web. Fig. 2 is a diagrammatic plan view showing the irregular or noncircular shaping mandrel connected to and rotating with the winding mandrel or an extension thereof, and a spring pressed roller for pressing the paper body against the noncircular surface of the shaping mandrel. Fig. 3 is a cross sectional view on line 3—3 of Fig. 2, showing a heating or drying chamber surrounding the shaping mandrel. Fig. 4 is a view, partly in vertical section, showing another construction of the winding and shaping mandrels, wherein the shaping mandrel is stationary or has no rotary movement with the winding mandrel, and wherein a spring pressed shoe is employed as the device for pressing the paper body against the flat side of the shaping mandrel during the drying operation. Figs. 5 and 6 are detail cross sections on lines 5—5 and 6—6 of Fig. 4 and Fig. 7 is a detail view of the shaping mandrel.

In the drawing, A represents the paper web, $a$, the circular or cylindrical paper body wound therefrom with its successive coils or laminæ $a^1$ united by the glue or paste $a^2$, and $A^1$ is the irregular or noncircular paper body as produced by my process, the same being, in the instance illustrated in the drawing, of a semi-circular cross section, or having a flat side or face $a^3$ and a convexly curved side or face $a^4$ united by round corners $a^5$.

In the apparatus or appliances diagrammatically illustrated in Figs. 1 to 3, B represents the paste or glue receptacle, and $b$ the paste applying rollers. C $C^1$ are knives or cutters for severing the paper web after a sufficient number of coils thereof have been wound upon the mandrel D to form a paper body. The rotating winding mandrel D is of cylindrical form or of circular cross section, and it has a gripper $d$ for gripping the end of the paper web and causing the paper web to wind thereon in a cylindrical coil as the mandrel rotates, the glue or paste coated face of the paper web serving to unite the several coils or laminæ of the cylindrical paper body as it is wound upon the mandrel. F is the shaping mandrel, the same merging or sloping from the circular or cylindrical form of the winding mandrel D or its extension $D^1$ into any desired irregular or noncircular shape according to the shape of the box body it is desired to be produced. In the instance illustrated in the drawing, the paper body is to be of semi-circular cross section, and the shaping mandrel F slopes or merges at $f$ from its circular or cylindrical shape at $f^1$ into the desired half round shape or cross section at $f^2$ which the finished body is desired to have, it being of course understood that the length of the circumference of the half round portion $f^2$ equals or substantially equals that of the circular portion $f^1$ and of the winding mandrel D upon which the paper web is originally wound. To cause the paper body to snugly hug the shaping mandrel F as the shaping mandrel rotates with the winding mandrel to which it is connected, especially at the flat irregular or noncircular portions of the shaping mandrel, I preferably provide a yielding pressure device or roller G mounted upon springs $g$, and which roller yields as required to permit the irregular shaped shaping mandrel to rotate. The paper bodies are pushed off of the winding mandrel D and along the shaping mandrel, preferably by a feeder or pusher H, such as is customarily employed in paper vessel body making machines. The feeder or pusher H also serves to push all the bodies, by one engaging another, onto and along the shaping mandrel, and to discharge the same from the free end thereof after they have been shaped and permanently set in the shaped form by the drying or baking step. The freshly formed paper bodies as they are produced by the winding mandrel are pushed directly off the same onto the shaping mandrel, and thereby shaped to the required form in cross section, while the glue or paste uniting the several coils or laminæ of the paper body is yet moist or undried. While the freshly formed and irregularly shaped paper bodies are yet with their glue or paste in a moist or undried condition, and while they are retained in the irregular or noncircular shape desired, they are preferably dried or baked, thus giving them permanently the desired shape or form. The drying or baking step is preferably performed while the freshly formed and shaped paper bodies are on and moving along the shaping mandrel, this being preferably done by a suitable heater of any desired kind, such as an electric heater, gas burners, etc., and the heat may be applied either inside the shaping mandrel, in which case the shaping mandrel should be hollow, or outside of the same. In the drawing, I have represented a heating chamber K surrounding the shaping mandrel. This chamber may be heated in any suitable way, or dry hot air may be supplied thereto.

The appliances for practising the invention, illustrated in Figs. 4 to 7, are substantially the same as those before described, excepting that the shaping mandrel F is stationary and has no rotary movement with the winding mandrel D. As shown in these figures, the shaping mandrel at its circular end is furnished with a journal $f^3$ fitting in a suitable journal bearing $d^1$ in the winding mandrel so that the winding mandrel may rotate without turning the shaping mandrel. In this form also, the pressure device $G^1$ for pressing the paper body against the flat face of the shaping mandrel, is preferably in the form of a spring pressed shoe, as indicated in the drawing; and as illustrated in this form, the heater or drier device K may preferably entirely surround the shaping mandrel.

In practising my invention, I prefer, as illustrated in the drawing, to subject the freshly formed cylindrical paper body as it is coiled from the web of paper, to a shaping pressure, both upon the inside and upon the outside; and the shaping pressure is preferably applied upon the inside by a mandrel which at one end is of circular form, or of the same size and shape as the winding mandrel, and which slopes, merges or tapers into the desired cross sectional form at its other end, and the external shaping pressure is preferably applied to the body by a pressure device in the form of a roller or shoe. In practising my invention, however, the shaping pressure may be applied wholly upon the outside or wholly upon the inside of the paper body. Instead of having the shaping mandrel in a solid or other form around which the paper body passes, the shaping mandrel may, if desired, be of a tubular form, through which the paper body passes on the inside. And while, in practising my invention, I prefer that the winding mandrel should be circular or truly cylindric in form, it will be readily understood by those skilled in the art, that the winding mandrel may be varied to a greater or less extent from such circular or true cylindrical form without departing from the principle of my invention. In any case, however, the end of the shaping mandrel which is adjacent to the end of the winding mandrel, should, of course, conform in cross section to the end of the winding mandrel, so that the paper body may pass directly from the winding mandrel to the shaping mandrel without obstruction. If desired, the winding mandrel and shaping mandrel may be made in one piece, where the appliances used for practising the invention are of the kind first illustrated, and wherein the winding mandrel rotates with the shaping mandrel.

I claim:

1. The process of making laminated paper bodies for vessels having an irregular or noncircular cross section and with a flat face consisting in first winding a web of paper in successive coils into a tubular form, and pasting or gluing the several coils or laminal thereof together, then, while the paste or glue uniting the several coils is still moist or undried, shaping the tubular body into the desired irregular or noncircular shape in cross section by applying pressure upon the inside and outside of said body, and then drying the same while maintained in such irregular or non-circular shape and while under internal and external pressure and thereby giving it a permanent set of the desired form, substantially as specified.

2. The process of making laminated tubular paper bodies of irregular or noncircular cross section, consisting in first forming a tubular coiled paper body, then while the paste or glue uniting its several coils is still moist and undried, shaping it into the required irregular or noncircular form in cross section by subjecting it to internal and external pressure and then imparting a permanent set to the re-shaped body by heating and drying it while maintained in such form, substantially as specified.

3. The process of making laminated tubular paper bodies of irregular or noncircular cross section, consisting in first forming a tubular coiled paper body, then while the paste or glue uniting its several coils is still moist and undried, shaping it into the required irregular or noncircular form in cross section by subjecting it to internal and external pressure, and then drying it while maintained in such form, said paper body being subjected to the action of a shaping device on both the inside and outside, during both the shaping and the drying steps, substantially as specified.

4. The process of making paper bodies of irregular or noncircular cross section, consisting in first forming a tubular paper body, and then shaping it into the required irregular or noncircular cross section by passing it longitudinally in contact with a tapering shaping device, and simultaneously subjecting it to a heating and drying action, substantially as specified.

FELIX EBERHART.

Witnesses:
M. H. ASKEY,
JOHN A. SMITH.